United States Patent

[11] 3,615,355

[72] Inventor Geoffrey Frederick Skinner
     Pinkneys Green, England
[21] Appl. No. 758,359
[22] Filed Sept. 9, 1968
[45] Patented Oct. 26, 1971
[73] Assignee Foster Wheeler Corporation
     Livingston, N.J.
[32] Priority Sept. 8, 1967
[33] Great Britain
[31] 41169/67

[54] METHOD OF COLLECTING AND TREATING EXHAUST GASES CONTAINING CARBON MONOXIDE
3 Claims, 1 Drawing Fig.

[52] U.S. Cl. ........................................... 75/60,
                                                   260/449.5
[51] Int. Cl. ........................................... C21c 5/38,
                                                   C07c 29/16
[50] Field of Search ........................................... 75/60, 59;
                                                   260/449.5

[56] References Cited
UNITED STATES PATENTS

| | | | |
|---|---|---|---|
| 3,134,835 | 5/1964 | Okaniwa | 75/60 X |
| 3,215,523 | 11/1965 | Richardson | 75/60 |
| 3,220,826 | 11/1965 | Okaniwa et al. | 75/60 |
| 3,446,747 | 5/1969 | Bongiorno | 260/449.5 |
| 3,456,928 | 7/1969 | Selway | 75/60 X |

FOREIGN PATENTS

| | | | |
|---|---|---|---|
| 193,475 | 5/1967 | U.S.S.R. | 260/449.5 |
| 950,072 | 2/1964 | Great Britain | 75/60 |

Primary Examiner—L. Dewayne Rutledge
Assistant Examiner—G. R. White
Attorneys—John Maier, II, Marvin A. Naigur and Constantine A. Michalos ABSTRACT: This invention relates to the use of the blow gases containing carbon monoxide which are derived from steelmaking processes. A joint must be provided between the steel converter apparatus and a collection pipe through which the blow gases are conveyed for use and, in view of very high temperature of the gases, it is difficult to provide a secure sealed joint. Therefore according to the invention the joint is sealed by a blast of carbon dioxide which prevents the egress of the blow gases past the joint to the atmosphere.

PATENTED OCT 26 1971
3,615,355
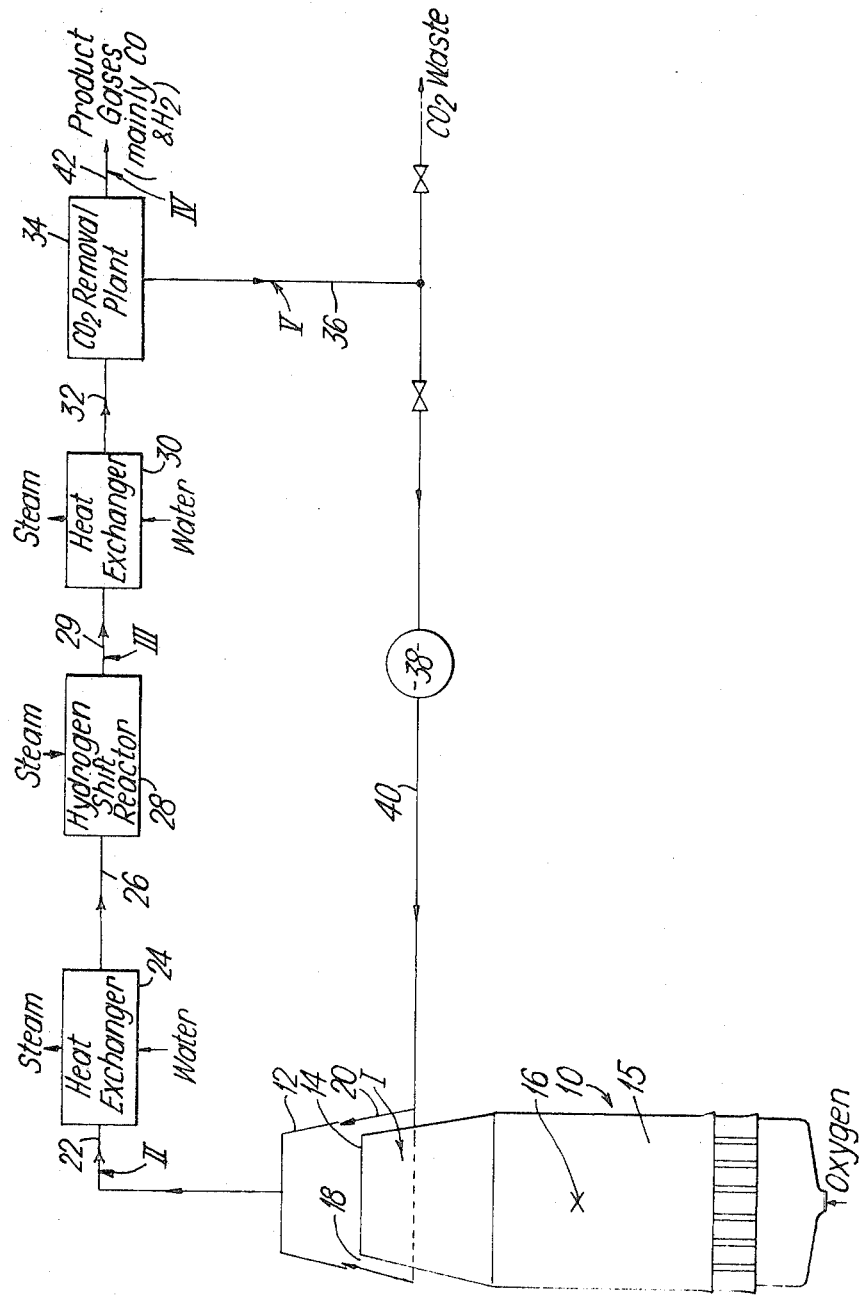
Inventor
By John Maier
Attorney

METHOD OF COLLECTING AND TREATING EXHAUST GASES CONTAINING CARBON MONOXIDE

During the production of steel, the iron is brought into intimate contact with oxygen or air in order to remove a large part of the carbon as carbon monoxide together with a small amount of carbon dioxide. When the iron is contacted with air, the CO content in the resultant blow gas is very much diluted by the nitrogen present in the air and so it is hardly worth collecting the blow gas which is usually left to burn as waste. In modern Steelmaking plants, however, oxygen is used and the blow gas will contain a substantial portion of CO, for example 80 percent of CO. It is, therefore, an economic proposition to collect the blow gas and use the CO contained in it.

The very high temperatures of these blow gases makes their collection rather difficult because the converter apparatus in which the steel is made is usually moveable and therefore one needs a joint between that apparatus and the collection pipe. It is important to make this joint satisfactory because the escape of CO must be avoided since it is toxic and inflammable, and the ingress of air leads to a wastage of the CO by dilution.

The invention has therefore been made with these points in mind.

According to the invention there is provided a process for the collection and use of the blow gases from steel production in which the very hot blow gases from the steel converter apparatus are collected in a collection conduit for passage to heat recovery apparatus and/or purification apparatus and/or reaction apparatus and the joint between the steel converter apparatus and the collection conduit is sealed by a blast of shielding gas directed at the joint in such a way as to prevent the egress of the very hot blow gases, this shielding gas being either carbon dioxide or steam, whereby if there is any passage of gas across the joint it is the passage of shielding gas which mixes with the blow gases.

In this way the very hot, toxic and inflammable blow gas is prevented from leaking out through the joint by the shielding gas and, if there is any passage of gas across the joint, it is the passage of $CO_2$ which occurs and not the passage of the blow gas.

If $CO_2$ is used as the shielding gas it can readily be obtained as a byproduct of, for example a "shift reaction" involving the blow gases whereby hydrogen and $CO_2$ are formed. A slightly larger $CO_2$ removal plant may be required, however, to remove the $CO_2$ which passes across the joint. If steam is used, on the other hand, this can readily be produced by using some of the heat content of the blow gases and its presence in the blow gases may in any case be required at some stage if it is added to the blow gases to take part in the "shift reaction."

With the process of the invention, there is no escape of the toxic and inflammable carbon monoxide and there is the additional advantage that the blow gases are not diluted as would be the case if nitrogen were used to prevent leakage of the gases and so the economy of collecting the blow gases is improved. The use of carbon dioxide has the advantages that $CO_2$ or steam are diluents which can be more easily removed downstream than $N_2$, and that $CO_2$ and steam are readily obtained as byproducts. The invention is equally applicable to the production of 98 percent pure CO using a $CO_2$ removal plant and $CO_2$ as the shielding gas.

DESCRIPTION OF THE DRAWING

The invention will now be illustrated with reference to the accompanying diagrammatic drawing which is a flow sheet of a process according to the invention.

DESCRIPTION OF THE PREFERRED EMBODIMENT

The blow gases from the steel converter 10 are collected in a hood 12 which covers the mouth 14 of the converter. These blow gases are formed by passing a stream of oxygen gas through a charge 15 of molten iron in the converter 10. The oxygen reacts with a large proportion of the carbon in the iron producing carbon monoxide and refines the iron to steel. The blow gases are naturally very hot and usually leave the converter at a temperature of the order of 2,500° F.

It is not possible to achieve a good sealing joint between the mouth 14 and hood 12 because of the high temperatures involved and the fact that the converter must be able to tilt around the point 16 to empty its charge. Therefore there is a gap 18 between the hood and converter mouth.

According to the embodiment of the invention shown, the blow gases which contain the toxic and inflammable CO are prevented from escaping through this gap 18 by blanketing the gap with a blast of $CO_2$ from a ring of nozzles 20 around the mouth of the converter and hood. The arrangement is such that a certain amount of $CO_2$ passes in through the gap 18 thus preventing any of the blow gases from escaping to the atmosphere.

The $CO_2$ mixes with the blow gases and does not react with them, and although a small dilution of the CO content occurs, this is small and the only disadvantage is that any $CO_2$ removal plant to which the blow gases eventually pass must be slightly larger than would be the case if the nozzles were fed with air or nitrogen to cope with the extra $CO_2$. The $CO_2$ which does mix with the blow gases is very easily removed compared with say nitrogen.

The gases collected in the hood 12 pass to a collection conduit 22 which feed them through a heat exchanger 24 where they are considerably cooled to temperatures of around 700° F. by heat exchange with water or other suitable material which is converted to steam for use elsewhere in the plant.

The cooled gases are then conducted via a line 26 to a hydrogen shift reactor 28 where they are mixed with water which may be in the form of steam and the mixture is subjected to the well known shift reaction whereby a substantial proportion of the CO is used to prepare hydrogen according to the reaction:

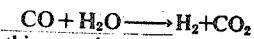
$$CO + H_2O \longrightarrow H_2 + CO_2$$

The steam for this reaction can be provided by the heat exchanger 24.

The gases pass via a line 29 to another heat exchanger 30 where they give up more heat and more steam is produced and then on via a line 32 to a $CO_2$ removal plant 34 where the $CO_2$ which is produced by the above reaction and that which enters through the gap 18 is separated in a conventional fashion.

The separated $CO_2$ removed via a line 36 and some is returned to the nozzles 20 surrounding the hood by means of a compresser 38 and line 40 while the remainder is either wasted or recovered as a byproduct.

After removal of $CO_2$, the gases are removed from the plant 34 via a line 42 and consist mainly of a mixture of hydrogen and carbon monoxide. The conditions of the shift reaction are chosen so that the relative proportion of these is that required for their further use. If one is primarily interested in obtaining hydrogen then one naturally tries to convert as much CO as possible to H, whereas if one wishes to use the gases in the preparation of methanol by the following reaction:

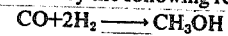
$$CO + 2H_2 \longrightarrow CH_3OH$$

one aims at producing about 2 volumes of hydrogen per 1 volume of carbon monoxide. The product gases in the line 42 are put to whatever use is required.

The invention can be applied to the use of the CO rich blow gases from any continuous or discontinuous steel-making process such as the L.D. and Kaldo processes, or the spray-steel process.

Instead of supplying $CO_2$ to the nozzles 20 surrounding the hood 12 one can instead supply steam. This has the advantage that this does not have to be removed at a later stage if one subjects the blow gases to a shift reaction with steam. Instead, one merely has to make up the steam content of gases to that required for the reaction. The steam required for this purpose can easily be provided by the heat exchangers 24 and 30.

The invention will now be illustrated by the following Examples of processes for the collection and use of the blow gases.

EXAMPLE 1

As one example of the invention, the blow gases from the steel-converter 10 may have the following composition:

CO .........80%
$CO_2$........10%
$N_2$.........10% and using gases of this composition we find that the production of methanol from one converter plant would be about 55 tons/day when nitrogen gas is used as the shielding gas, and 74 tons/day when $CO_2$ is used as the shielding gas, with negligible increase in capital cost of the plant.

EXAMPLE 2

A process according to the invention was operated using an apparatus as shown in the drawing with $CO_2$ as the shielding gas. The flow of $CO_2$ across the gap 18 was about 10 lb moles per hour (i.e. 10 percent by volume) and the composition of the gas flowing at the points I to V on the drawing in lb. mole of each component at that point was as shown in the following Table.

| Component | I | II | III | IV | V |
|---|---|---|---|---|---|
| CO | 80 | 80 | 26.2 | 26.2 | |
| $CO_2$ | 10 | 20 | 73.8 | 0.4 | 73.4 |
| $H_2$ | | | 53.8 | 53.8 | |

In this case it will be noted that at the point III after the shift reaction the ratio of $H_2/CO$ was 2.05 which was the design ratio of those two components for a methanol production stage using the product gases from point IV.

The volume of gases passing the point IV and available for conversion to methanol was 817.4 $Nm^3$/hour and in the methanol production stage under consideration 2314 $Nm^3$ of the gas product at point IV were required to produce 1 tonne of methanol. Therefore the rate of methanol production was 817.4/2314=Cw0.353 ton/h. or 778 lb./h.

The quantity of gas from the converter, i.e. passing point I, is 2681 lb./h. and so the ratio of methanol produced to gas feed = 788/2681 =0.290.

EXAMPLE 3 (comparison)

In a comparison case not according to the invention where a process similar to the one described in Example 2 was run using $N_2$ instead of $CO_2$ as the shielding gas the composition of gas at the points I to V on the drawing in lb. mole of each component at that point was as follows:

| Component | I | II | III | IV | V |
|---|---|---|---|---|---|
| CO | 80 | 80 | 22.9 | 22.9 | |
| $CO_2$ | 10 | 10 | 67.1 | 0.5 | 66.6 |
| $H_2$ | | | 57.1 | 57.1 | |
| $N_2$ | | 10 | 10 | 10 | |

In this case the ratio of $H_2/CO$ after the shift reaction was required to be 2.49 for methanol production, and the volume of gases passing the point IV and available for conversion to methanol was 920.1. In the methanol production stage 3309 $Nm^3$ of the gas product at point IV were required to provide 1 tonne of menthanol and so the rate of methanol production was 920.1/3309=0.278 ton/h. or 0.612 lb./hr.

Thus in this case using virtually the same apparatus and using the same blow gas the ratio of methanol produced to gas feed = 612/2681=or only 79 percent of the output available in Example 2 by following the invention.

Therefore it can be seen how by following the invention and using $CO_2$ as the shielding gas the output of methanol can be increased using virtually the same plant. Therefore the efficiency of the overall process can be considerably increased.

A latitude of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention herein.

I claim:

1. A process in which steel is produced in a converter and a blow gas which is largely carbon monoxide is collected from the converter by placing a hood over the mouth of the converter comprising the steps of:
   collecting the blow gas in said hood;
   cooling the blow gas to a temperature appropriate for the following step;
   in a hydrogen shift reaction, reacting some of the carbon monoxide in the blow gas with steam to yield hydrogen and carbon dioxide;
   cooling the resulting mixture still further;
   removing as much carbon dioxide from the resulting mixture as possible to yield a product gas which is mostly carbon monoxide and hydrogen; and
   passing some of said carbon dioxide removed from said resulting mixture between said hood and said mouth to prevent the escape of said blow gas from between said hood and said converter.

2. The process defined in claim 1 wherein said resulting mixture is cooled by indirect heat exchange with water which is transformed into steam, and wherein said steam is mixed with said mixture before it is subjected to said hydrogen shift reaction.

3. The process defined in claim 2 wherein said product gas is used to prepare methanol.